US008526126B2

(12) United States Patent
Seidl et al.

(10) Patent No.: US 8,526,126 B2
(45) Date of Patent: Sep. 3, 2013

(54) OBJECTIVE

(75) Inventors: Kristof Seidl, Dresden (DE); Jens Knobbe, Dresden (DE)

(73) Assignee: Fraunhofer-Gesellschaft zur Foedrderung der angewandten Forschung e.V., Munich (DE)

( * ) Notice: Subject to any disclaimer, the term of this patent is extended or adjusted under 35 U.S.C. 154(b) by 0 days.

(21) Appl. No.: 13/221,177

(22) Filed: Aug. 30, 2011

(65) Prior Publication Data

US 2012/0050891 A1    Mar. 1, 2012

(30) Foreign Application Priority Data

Aug. 31, 2010  (DE) .......................... 10 2010 040 030

(51) Int. Cl.
    *G02B 17/00*    (2006.01)
(52) U.S. Cl.
    USPC .......................................... 359/730; 359/737
(58) Field of Classification Search
    USPC ................... 359/633, 729–731, 737
    See application file for complete search history.

(56) References Cited

U.S. PATENT DOCUMENTS

| 2,485,345 | A | 10/1949 | Ackerman |
| 6,292,309 | B1 | 9/2001 | Sekita et al. |
| 6,337,776 | B1 * | 1/2002 | Kamo .......................... 359/834 |

FOREIGN PATENT DOCUMENTS

| DE | 69624021 T2 | 3/2003 |
| EP | 0730179 B1 | 9/1996 |
| EP | 0921427 B1 | 6/1999 |

* cited by examiner

*Primary Examiner* — William Choi
(74) *Attorney, Agent, or Firm* — Keating & Bennett, LLP

(57) ABSTRACT

An objective is described consisting of a monolithic body of a material at least partly transparent for a part of an electromagnetic spectrum, and whose surfaces include a first optical refractive functional area serving as entrance area through which electromagnetic radiation can enter the objective, a second optical reflective functional area serving as a first mirror, a third optical reflective functional area serving as a second mirror, a fourth optical reflective functional area serving as a third mirror, a fifth optical reflective functional area serving as a fourth mirror, and a sixth optical refractive functional area serving as an exit area through which electromagnetic radiation can exit the objective, wherein the first to sixth optical functional areas are implemented such that a center shading-free, folded optical path extends from the entrance area through the monolithic body via first to fourth mirrors to the exit area, wherein no intermediate image level is located in the same between the entrance area and the exit area.

21 Claims, 5 Drawing Sheets

OBJECTIVE

CROSS-REFERENCE TO RELATED APPLICATIONS

This application claims priority from German Patent Application No. 102010040030.0, which was filed on Aug. 31, 2010, and is incorporated herein in its entirety by reference.

BACKGROUND OF THE INVENTION

The present invention relates to objectives.

Many products necessitate compact and light objectives having a high imaging performance, which should, however, be cost-effective to produce.

Depending on requirements, several lenses and lens groups having different optical characteristics are necessitated in conventional objectives, for example to sufficiently correct geometric imaging errors or color errors. For lowering production costs, glass lenses can be produced, besides conventional grinding and polishing methods, for example in blank molding technology. Still, cost-intensive mechanical lens mounts and an assembly with different processing steps are necessitated.

Further, lenses can be produced cheaply in high quantities with plastic forming technology. The material shrinkage resulting during the forming process, which leads to homogeneity variations of the material, local modifications of the refraction index or shape deviations in the optical areas, can mostly be compensated with corrective free-form surfaces in the molding tool.

For correcting, for example, the color error of an objective with little optical effort, it is possible to use purely reflective optical systems. Depending on the design, these objectives are very sensitive to production and assembly tolerances, such that the same are unsuitable for large volumes.

To combine the advantages of reflective and refractive systems and at the same time to lower production costs, so-called monolithic objectives having reflective and refractive functional areas are known (EP 0 921 427 B1, DE 696 24 021 T2). They consist of a full body transparent for part of the electromagnetic spectrum having respective functional areas on its surface. Forming these monolithic systems is thereby mostly achieved directly in one production step, such as injection molding. Accordingly, with such systems, the number of optical elements can be limited to one, the assembly and adjustment effort can be reduced significantly and, hence, costs can be reduced to a certain extent. Further, no expensive mechanical mounts are necessitated since the monolithic objective includes all optical functional areas in a self-supporting manner.

To be able to produce monolithic systems in plastic forming technology, molds have to be provided having several angularly arranged high-precision aspheric areas or also free-form areas. These molds are produced with common multi-axes CNC ultra-precision machine tools as one component or from several ultra-precisely assembled parts.

Despite the ultra-precision processing technologies common nowadays, mold production costs increase with every optical functional area and its mold complexity. The systems in EP 0 921 427 B1 and DE 696 24 021 T2 have at least seven highly complex free-form areas mathematically described by higher-order polynomials. This increases production costs and additionally reduces the light intensity of the objective due to absorption losses. Additionally, the mathematical description the optical functional area is complex, which makes production of the same more difficult and more cost-intensive.

The embodiments shown in EP 0 921 427 B1 and DE 696 24 021 T2 all comprise intermediate imaging, which lengthens the optical path and hence makes the structure more bulky. Additionally, in the embodiments of EP 0 921 427 B1 and DE 696 24 021 T2, the system apertures simultaneously serving as entrance pupils are arranged in the optical path in front of the first optical functional element. However, with a system aperture arranged outside the objective it is very difficult to correct imaging errors due to the lack of symmetry within the system.

Further, the embodiments of the above-stated patent literature show an arrangement of the image sensor with an air gap to the last, mostly bent optical functional area, so that additional and cost-intensive mechanical components are necessitated for alignment and permanent fixing of the image sensor. This increases the difficulty of mounting the sensor exactly and with few tolerances.

Frequently, PMMA or Zeonex® is used forming material for monolithic plastic systems.

The anti-reflective and rear-side mirroring layers necessitated for the monolithic objective can be efficiently deposited in several coating processes with common large-volume plants.

Although the above solutions already individually show several advantages, a compact objective without intermediate images would be desirable, which is not only shock resistant, has a high imaging quality and can be produced in large volumes at low costs, but which also comprises a large image field of more than ±25° on the diagonal, an initial opening of less than F4.5, a small number of optical functional areas and a simple, exact and cost-effective assembly option for the image sensor.

SUMMARY

An embodiment may have an objective consisting of a monolithic optically transparent body, the surface of which may have: a first optical refractive functional area serving as entrance area through which electromagnetic radiation can enter the objective; a second optical reflective functional area serving as a first mirror; a third optical reflective functional area serving as a second mirror; a fourth optical reflective functional area serving as a third mirror; a fifth optical reflective functional area serving as a fourth mirror; a sixth optical refractive functional area serving as an exit area through which electromagnetic radiation can exit the objective, wherein the first to sixth optical functional areas are arranged such that a center shading-free, folded optical path extends from the entrance area through the monolithic body via the first mirror, the second mirror, the third mirror and the fourth mirror to the exit area—in the stated order—wherein no intermediate image level is located between the entrance area and the exit area.

According to another embodiment, an image-capturing system may have: an inventive objective; an image sensor arranged in an image level of the objective.

An inventive objective consists of a monolithic body made of a material at least partly transparent for part of an electromagnetic spectrum, whose surfaces comprise a first optical refractive functional area serving as an entrance area, through which electromagnetic radiation can enter the objective, a second optical reflective functional area serving as a first mirror, a third optical reflective functional area serving as a second mirror, a fourth optical reflective functional area serving as a third mirror, a fifth optical reflective functional area serving as a fourth mirror, and a sixth optical refractive functional area serving as an exit area through which the electromagnetic radiation can exit the objective, wherein the first to sixth optical functional areas are implemented such that a center shading-free, folded optical path extends from the entrance area through the monolithic body via the first to fourth mirrors to the exit area since no intermediate image level exists between the entrance area and the exit area.

The monolithic objective having reflective and refractive optical functional areas combines the above-stated advantages of mirror optics and refractive systems with simultaneously lowering production and assembly costs, especially in the case of large volumes. In comparison with mirror optics having a modular structure, the assembly volume can be reduced since expensive mechanical holders for the individual elements can be omitted.

Since the objective consists of a monolithic body, additional mechanical mount parts can be omitted, as it is otherwise not possible in reflective and refractive objectives having a modular structure.

Objectives according to the present invention can be used in applications such as mobile devices, in automobile technology or in unmanned aviation, i.e. applications that have so far not been possible with all the stated advantages.

Since the number of optical functional areas is relatively low according to embodiments, the production price of the mould for the objectives according to these embodiments is also low. According to embodiments, not only the number of optical functional areas is low, but the optical functional areas can also be described with spherical, conical or biconical areas, so that a robust and inexpensive production of the mould can be obtained, for example for plastic forming, as only a few, for example spherical, conical or biconical areas are used, which can be described in a simple mathematical manner. Additionally, due to the reduced number of functional areas, the negative influence of absorption losses at every optical functional area on the light intensity of the objective is reduced. Since there is no intermediate imaging, the optical path can be shortened and, hence, a more compact design can be obtained. According to embodiments, the system aperture is located in the optical path between the optical functional elements, so that it is possible to correct possibly existing image errors with less functional areas, and hence to obtain higher image quality. Additionally, according to embodiments, a refractive functional area of the monolithic objective serving as exit area is implemented in a planar manner, so that an image sensor that can be encapsulated with a planar cover glass can be directly attached to or mounted on this functional area without any additional mechanical components, which significantly lowers assembly tolerances and reduces costs.

BRIEF DESCRIPTION OF THE DRAWINGS

Embodiments of the present invention will be detailed subsequently referring to the appended drawings, in which.

DETAILED DESCRIPTION OF THE INVENTION

Figure 1A:
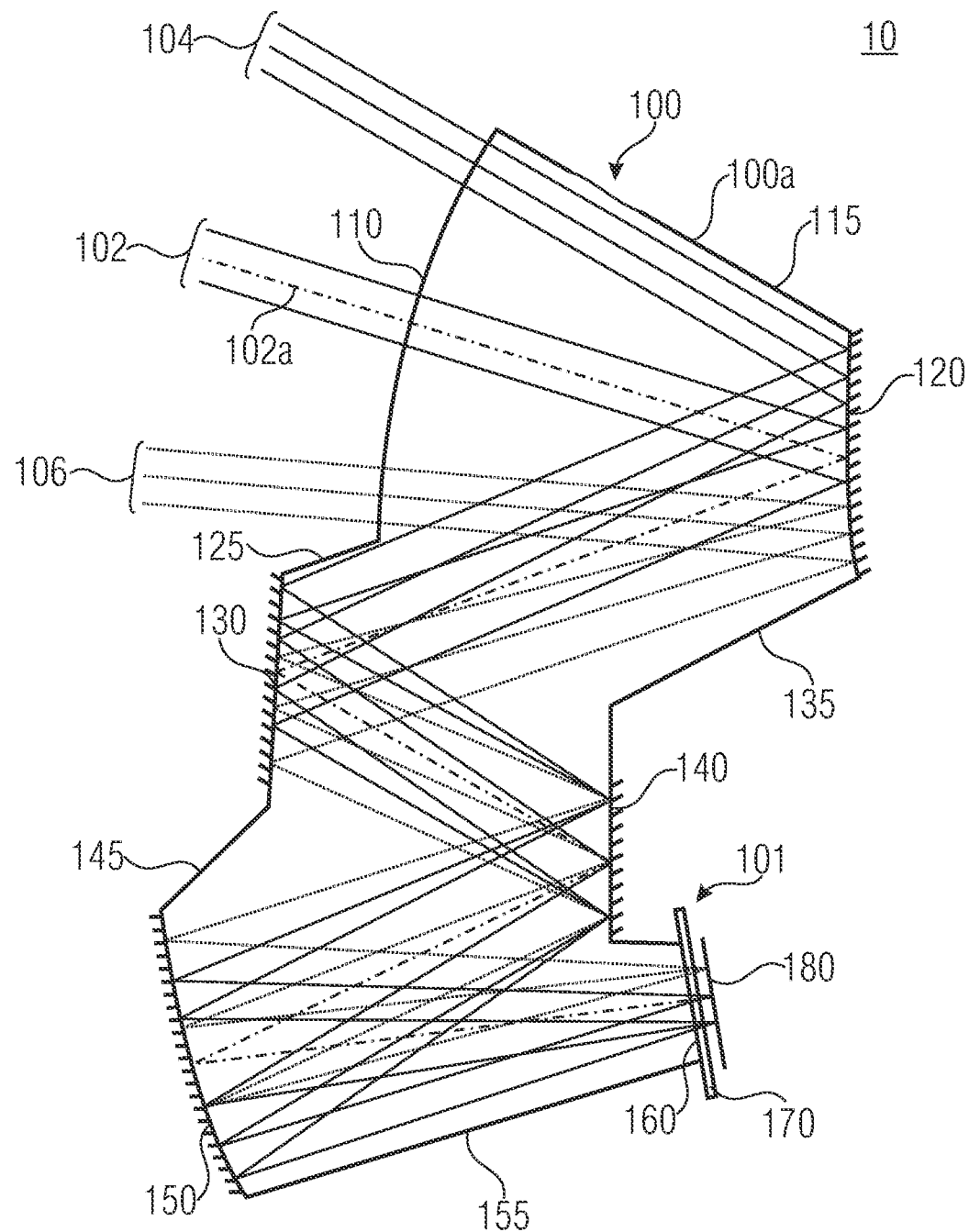
FIGS. 1a, 1b and 1c is a sectional view of a main sectional plane, a side view and an isometric view of an image-capturing system with an objective according to an embodiment of the present invention and an image sensor.
Figure 1B:
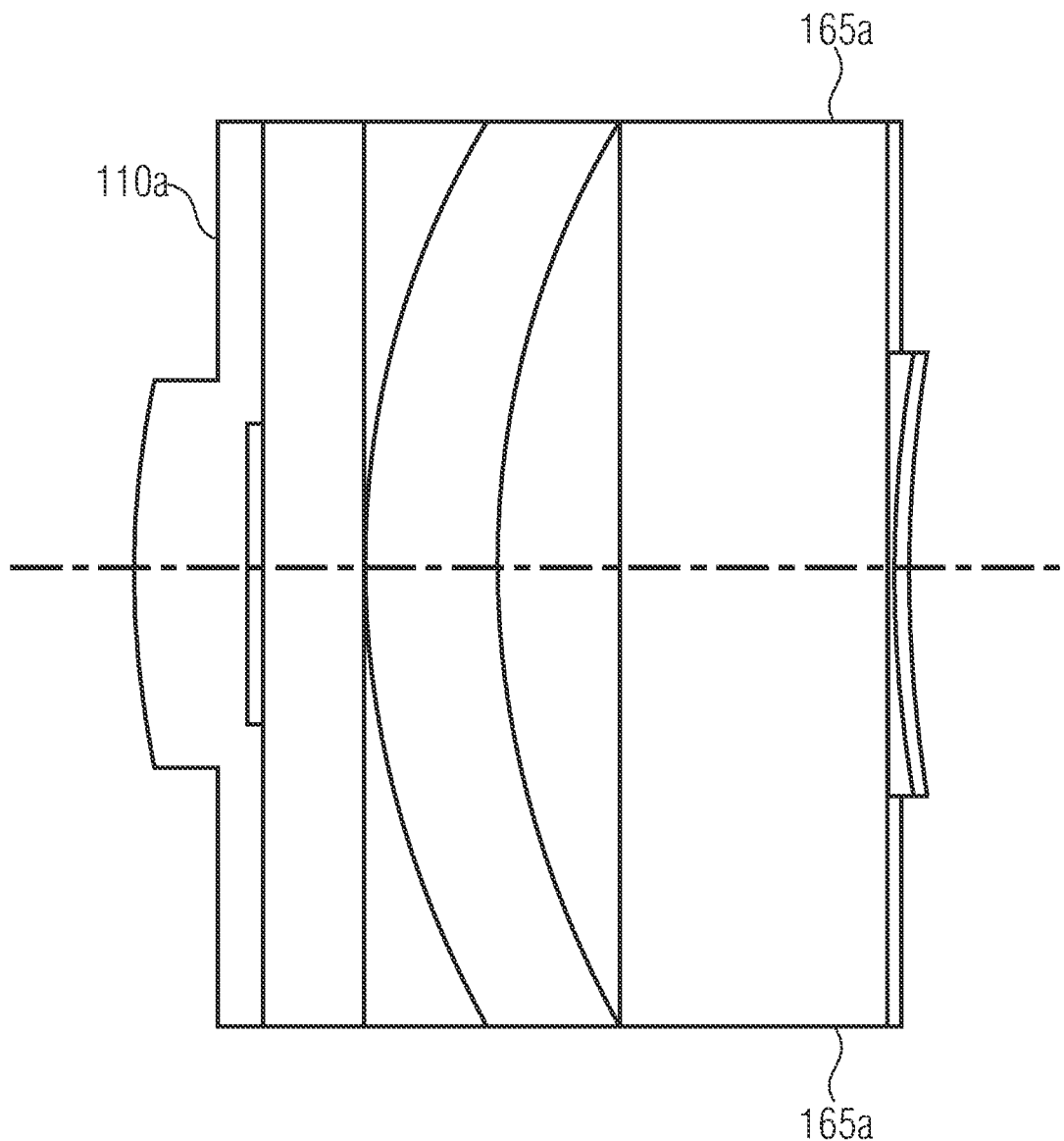
Figure 1C:
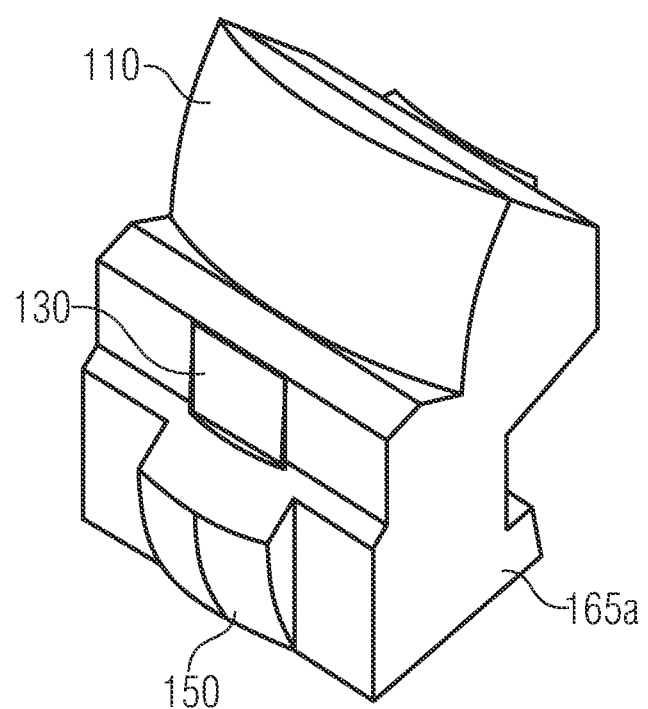

FIGS. 1a-c show an image-capturing system having an objective 100 according to an embodiment and an image sensor 101.

The objective 100 is, in particular, a center shading-free monolithic objective having refractive and reflective functional areas. It consists of a monolithic body 100a made of a material at least partly transparent for part of an electromagnetic spectrum, the surface of which comprises portions defining specific functional areas 110, 120, 130, 140, 150 and 160, wherein the functional areas 110 and 160 are refractive functional areas serving as entrance area and exit area, respectively, and the optical functional areas 120, 130, 140, 150 are reflective functional areas serving as respective mirrors. The functional areas 110-160 are implemented such that a center shading-free, folded optical path is formed from the entrance area 110 through the monolithic body 100a via mirrors 120-150 to the exit area 160 in the order just stated, which is indicated in FIG. 1a by reference number 102a. The optical path is intermediate image-free, i.e. there is no intermediate image level in the optical path 102a between entrance area 110 and exit area 160.

The monolithic center shading-free objective 100 of FIGS. 1a-c has an image field of ±26° on the diagonal. The objective 100 of FIGS. 1a-c is an example for an objective where not all functional areas 110-160 are arranged on a common optical axis, which is referred to as "off-axis arrangement", but rather at least two of the functional areas 110-160 are arranged such that they have a differing optical axis, wherein the objective 100 of FIGS. 1a-c resembles an "oblique reflector" type. It is explicitly stated that even with an "off-axis arrangement", a center shading-free objective 100 of a monolithic body having the two refractive functional areas and the four reflective functional areas that are located in the optical path in between would be possible.

As has already been mentioned, the first to sixth optical functional areas are arranged such that a folded optical path 102a extends from the first functional area 110 via the second functional area 120, the third functional area 130, the fourth functional area 140 and the fifth functional area 150 to the sixth functional area 160 and generates, in the area of the depth of focus, an optical image on the chip 180 of the image sensor 101, which is mounted directly on the planar exit area 160 with its cover glass 170.

Thereby, the fourth functional area 140 forms the system aperture, which thus lies within the optical path 102a. With the system aperture lying within the optical path, it is easier to correct imaging errors by making use of symmetries and, thus, to obtain a higher image quality with less and simpler areas. In particular, the position of the third functional area 130 and the fifth functional area 150 in relation to the system aperture as well as the curvature of the two functional areas 130 and 150 have a positive effect on the aberration correction.

The objective 100 is implemented such that the exit pupil is almost at infinity and, hence, an optical path that is almost telecentric on the image side is formed. In an optical path that is telecentric on the image side, the principal rays of the individual beams run behind the last functional area of an objective in parallel and can, hence, also impinge perpendicularly on the image sensor. If, however, beams running at the far edge were to impinge in an oblique manner on the digital image sensor, shadings of the light-sensitive sensor area could occur due to elevated conductive traces on the chip, or so-called ghost images could occur due to reflections at the cover glass. For as few additional aberrations as possible to occur on the exit area, the same is implemented as a planar area, which enormously simplifies its producibility and hence significantly reduces the costs for mold production.

In other words, the objective 100 is implemented such that the optical exit area 160 is planar and is located close to the image level of the objective 100, so that the image sensor 101 can easily be mounted on the exit area 160. In this manner, the image-capturing system 10 of FIGS. 1a to c is very robust, since the image-capturing system 10 is self-contained and does not necessitate a housing where the objective 100 and the image sensor 101 have to be kept in a specific relative position to one another.

With this method, the assembly effort can be significantly reduced and, hence, enormous cost advantages can be achieved. Further, critical adjustment and assembly tolerances are avoided.

The arrangement of the first to sixth optical functional areas is additionally implemented such that no intermediate image level is in the optical path 102a between the entrance area 110 and the exit area 160 of the monolithic objective. Thereby, the monolithic objective can be made more compact than with objectives having an intermediate image level, since an intermediate image level would lengthen the optical path 102a. As one example, beams 102, 104, 106 for three different field spots or object spots are shown. The path of the three different beams 102, 104, 106 through the objective 100 to the image level 180 or the image sensor 101 is shown.

The entrance area 110 has a convex surface shape and is arranged such that its center of curvature approximately coincides with the center of an entrance pupil of the monolithic objective. Thereby, the beams at the entrance area are only slightly refracted and, hence, introduce only slight geometric and chromatic aberrations into the system. Further, the entrance area 110 can be implemented such that the same allows only radiation from a certain range into the objective, which avoids scattered and stray light.

With the stated implementation of the entrance area, the imaging optical path is mainly formed via the reflective functional areas 120, 130, 140, 150, where no wavelength-dependent imaging errors or chromatic aberrations result. Depending on the used material, the monolithic objective can be used in the large wavelength range of the electromagnetic spectrum, for example in VIS and/or NIR.

Before a further embodiment for an objective will be described with reference to FIG. 2, it should be noted that several reference numbers that have already been used in FIGS. 1a-c are used again to indicate the same or functionally equal elements. The description of FIGS. 1a-c also applies to FIG. 2, as long as no deviations are explicitly indicated in the description of FIG. 2.

Like FIGS. 1a-c, FIG. 2 shows an image-capturing system 20 having an objective 200 of a monolithic body 200a and an image sensor 201. Like the body 100a of FIGS. 1a-c, the surface of the monolithic body 200a defines two optical refractive functional areas 110 and 160 as well as four optical reflective functional areas 120 to 150 that serve as entrance area, exit area or mirror and are arranged such that a center shading-free, folded and intermediate image-free optical path 102a extends from the entrance area 110 through the monolithic body 200a via mirrors 120 to 150 to the exit area 160.

Figure 2:
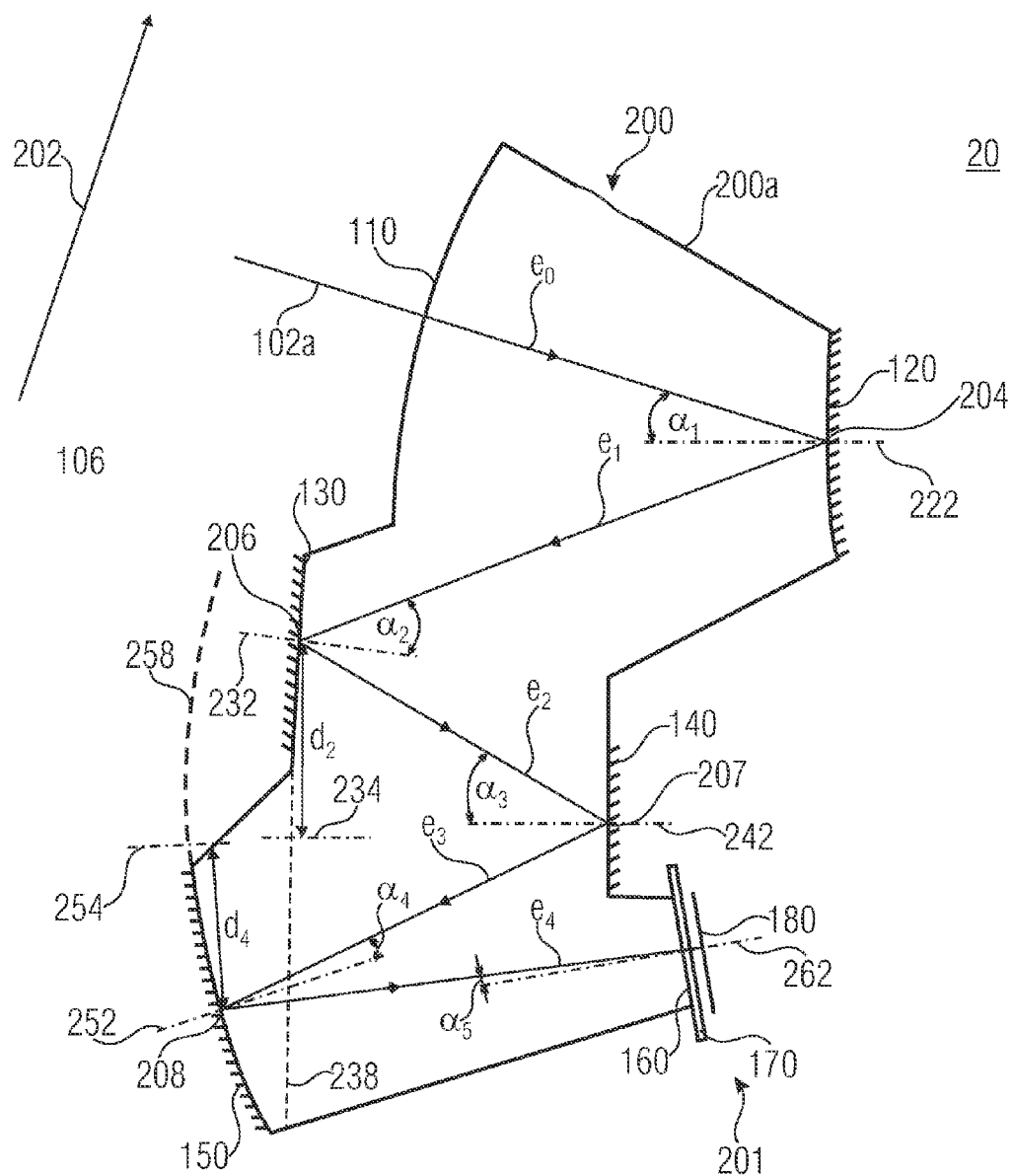
FIG. 2 is a top view of an image-capturing system with an objective according to a further embodiment of the present invention and an image sensor.

The optical axis 102a of FIG. 2 is divided into several axes of construction $e_0$, $e_1$, $e_2$, $e_3$ and $e_4$. The axis of construction $e_0$ impinges on the optical functional area 120 in a first impinging point 204 through the entrance area 110, from where the second axis of construction $e_1$ impinges on the optical functional area 130 in a second impinging point 206, from where again the third axis of construction $e_2$ impinges on the functional area 140 in a third impinging point 207, from where again the fourth axis of construction $e_3$ impinges on the functional area 150 in a fourth impinging point 208, from where again the last axis of construction $e_4$ impinges on the image level 180 through the exit area 160.

Thus, the objective 200 also represents a monolithic objective with reflective and refractive functional areas 110-160 and is structured such that the optical path 102a from an object 202 passes the entrance area 110 almost at a right angle to the surface normal of the entrance area 110 and impinges on the first mirror 120 such that the first axis of construction $e_0$ and the optical axis 222 of the first mirror 120 enclose an angle $\alpha_1$. Corresponding to the law of reflection, the optical path 102 runs along the second axis of construction $e_1$, which encloses the double angle $\alpha_1$, i.e. $2\alpha_1$, together with the first axis of construction $e_0$, to the second mirror 130. The second axis of construction $e_1$ and an axis of incidence 232 of the second mirror 130 enclose an angle $\alpha_2$. After reflection at the second mirror 130, the optical path 102 runs, again according to the law of reflection, along the third axis of construction $e_2$, which encloses the double angle $\alpha_2$ together with the second axis of construction $e_1$, to the third mirror 140. The third axis of construction $e_2$ and an axis of incidence 242 of the third mirror 140 enclose an angle $\alpha_3$. After reflection at the third mirror 140, the optical path 102a runs, again according to the law of reflection, along the fourth axis of construction $e_3$, which encloses the second angle $\alpha_3$ together with the third axis of construction $e_2$, to the fourth mirror 150. Thereby, the fourth axis of construction $e_3$ and an axis of incidence 252 of the fourth mirror 150 enclose an angle $\alpha_4$. The optical path 102a runs further along a fifth axis of construction $e_4$, which encloses the double angle $\alpha_4$ together with the fourth axis of construction $e_3$, to the exit area 160 and beyond to the image sensor 201, i.e. the cover glass 170 and the photosensitive area 180 behind the cover glass 170, such as the chip of the image sensor 201, wherein the photosensitive area again defines the image level. The fifth axis of construction $e_4$ and an area normal 260 on the exit area 160 at the location where the fifth axis of construction $e_4$ is based on the exit area 160 enclose an angle $\alpha_5$.

According to the law of reflection, the term axis of incidence relates to the bisecting symmetrical axis between the two axes of construction impinging on a respective mirror 120-150 along the optical path 102a.

The lengths of the first to the fifth axes of construction $e_0$ to $e_4$ determine the distance between the respective optical functional areas.

The second and fourth mirrors 130 and 150 in the direction of the optical path can represent a segment of a mirror, i.e. bent mirror areas having an optical axis 234 or 254, which is here even beyond the actual mirror area 130 or 150, in any case spaced apart from the physical center of the actual mirror areas, i.e. the respective possibly mirrored surface of the monolithic body. Mentally, the functional areas 130 and 150 are continued beyond the respective optical axes 254 and 234 in FIG. 2 by dashed lines 238 and 258. The dashed areas 238 and 258 are not necessitated or do not have to exist, since they do not represent or include any optically active areas, i.e. areas contributing to the optical imaging of the object 202. Using the mirror segments 130 and 150 instead of the whole mirrors allows shading-free arrangement of the mirror of the objective 200 with a simultaneously effective option for aberration correction. The distances between the impinging points 206 and 208 of the central beam 102 (cf. FIG. 1a) on the mirrors 130 and 150 used in an off-axis manner and their optical axes 234 and 254 are indicated in FIG. 2 by $d_2$ or $d_4$. Thereby, the amount of the distance of a lateral shift $d_2$ from the optical axis 234 to the impinging point 206 of the second axis of construction $e_1$ on the second mirror 130 or a distance of the optical axis 234 from the impinging point 206, for example 9.55 mm, and the distance $d_4$ from the optical axis 254 of the fourth mirror 150 to the impinging point 208 of the fourth axis of construction $e_3$ on the fourth mirror 150, for example 8.03 mm, wherein, however, the distances can be slightly different in modified embodiments.

The distances are each stated orthogonally to the respective optical axis 234 or 254 of the second mirror 130 or the fourth mirror 150.

Since a large distance from the fourth mirror 150 to the image level 180 or the sensor 201, referred to as rear focal distance, is necessitated, the objective 100, 200 is implemented as a retro focus type having a convex first mirror 120. The second mirror 130 and the fourth mirror 150 have a concave curvature. The third mirror 140 acts again as a system aperture and has a slightly convex curvature.

The main symmetry direction of the angular tilt of the individual mirrors is determined by the shown axes $e_0$, $e_1$, $e_2$, $e_3$ and $e_4$. The tilt angles $\alpha_1$, $\alpha_2$, $\alpha_3$ and $\alpha_4$ are associated with the respective mirror and determine the tilt relative to axes $e_0$ to $e_4$. $\alpha_5$ refers to the tilt angle of the exit area 160 and, hence, also the image level 180 and the sensor cover glass 170.

The shading-free arrangement is obtained by a trade-off of tilt angles $\alpha_1$ to $\alpha_5$ and the distances between the optical components measured as length of axes $e_1$ to $e_4$. The rotations are performed for the first mirror 120 and the third mirror 140 and the exit area 160 or the image sensor 180 including cover glass 170 on the one hand, as well as for the second mirror 130 and the fourth mirror 150 on the other hand in opposite directions. The larger the rotation angles of the mirrors, the more difficult it is to correct, for example, the astigmatism and the coma caused thereby. However, with a decreasing rotation angle, in most cases, the distance between the respective mirrors has to be enlarged, which again influences the necessitated effective diameter of the mirrors. Further, rotation angles and distances depend, for example, on the space requirements of the image sensor 201 and its board with read-out electronics.

The second mirror 130 is arranged such that the same is outside the beam incident through the entrance area 110. In other words, radiation impinging from the object 202 on the first mirror 120 is not shaded by the second mirror 130. Thereby, the tilt angle $\alpha_1$ of the first mirror 120 is at 18.63°. The second mirror 130 is rotated opposite to the first mirror 120 by $\alpha_2 = -21.07°$.

Since the fourth mirror 150 is also rotated clockwise with $\alpha_4 = -9.41°$ but the distances are not sufficient to arrange the image sensor 180 in a shading-free manner, the third mirror 140 is arranged in the aperture level and rotated anticlockwise with the angle $\alpha_3 = 27.68°$.

For correcting the optical imaging errors, mainly coma and astigmatism, mirrors 120 to 150 are implemented, for example, as conic aspheres, which are used on the axis or off-axis. Hence, in the above embodiments, biconical areas, higher-order aspheres or free-form areas that can be described, for example with the help of complete polynomials, polynomial extensions of spherical areas or with non-uniform rational B-splines, in short NRUBS, can be omitted. NURBS are geometric elements, such as curves or areas that can be used for modeling any molds, that are mathematically functionally defined bit by bit. With the low number of four conical aspheres, a planar area 160 and a spherical entrance area 110, it is possible to ensure an inexpensive and robust production of the mold for plastic forming.

Additional imaging errors, mainly inherent astigmatism and coma, can be corrected with the second mirror 130 and the fourth mirror 150. In order to correct the mainly occurring astigmatism and coma in the system, for example off-axis biconical surfaces can be used. Biconical means here that two levels that are perpendicular to one another have different radii of curvature and/or different conical constants.

Both monolithic objectives 100/200 with reflective and refractive functional areas and a center shading-free optical path 102a have, for example, a diagonal image field angle of ±26 degrees with an initial opening of F2.0 and include a refractive entrance area 110, four rear-area mirrored optical functional areas 120, 130, 140, 150 and one exit area 160. Further, an image level 180 and an image sensor, respectively, with associated sensor cover glass 170 is illustrated. The objective respectively produces an image of an object 202 at the location of the image level 180 and the image sensor, respectively.

The complete optical characterization of the embodiment shown in FIGS. 1a-c and FIG. 2 can be found in the following table. Table 1 includes the values of the tilt angles and the distances between the elements and the radii of curvature and conical constants. Thereby, negative radii of curvature can be considered as convex shapes and positive radii of curvature as concave shapes. A conical constant above zero results in an oblate ellipsoid.

TABLE 1

Optical arrangement of a monolithic objective of PMMA with reflective and refractive optical functional areas - image angle: 24.8° V × 47.6° H; F#: 2.0; focal length: 6.80 mm

| Element | Radius/ mm | Conical constant | Distance/ mm | Angle | Decentration/ mm |
|---|---|---|---|---|---|
| Entrance area 110 | 37.40 | 0 | $e_0 = 21.02$ | | |
| First mirror 120 | −48.64 | −0.60 | $e_1 = 28.19$ | $\alpha_1 = 18.63°$ | |
| Second mirror 130 | 141.46 | −37.73 | $e_2 = 17.50$ | $\alpha_2 = 21.07°$ | $d_2 = 9.55$ |
| Third mirror 140 | −87.30 | 46.70 | $e_3 = 21.19$ | $\alpha_3 = 27.68°$ | |
| Fourth mirror 150 | 35.14 | 0.33 | $e_4 = 23.04$ | $\alpha_4 = 9.41°$ | $d_4 = 8.03$ |
| Exit area 160 | ∞ | 0 | 0 | $\alpha_5 = 4.91°$ | |
| Image sensor 101/201 | | | | | |

The cover glass 170 and the image sensor at the location of the image level 180 are optional components and not necessarily part of the described monolithic objective.

Figure 3:
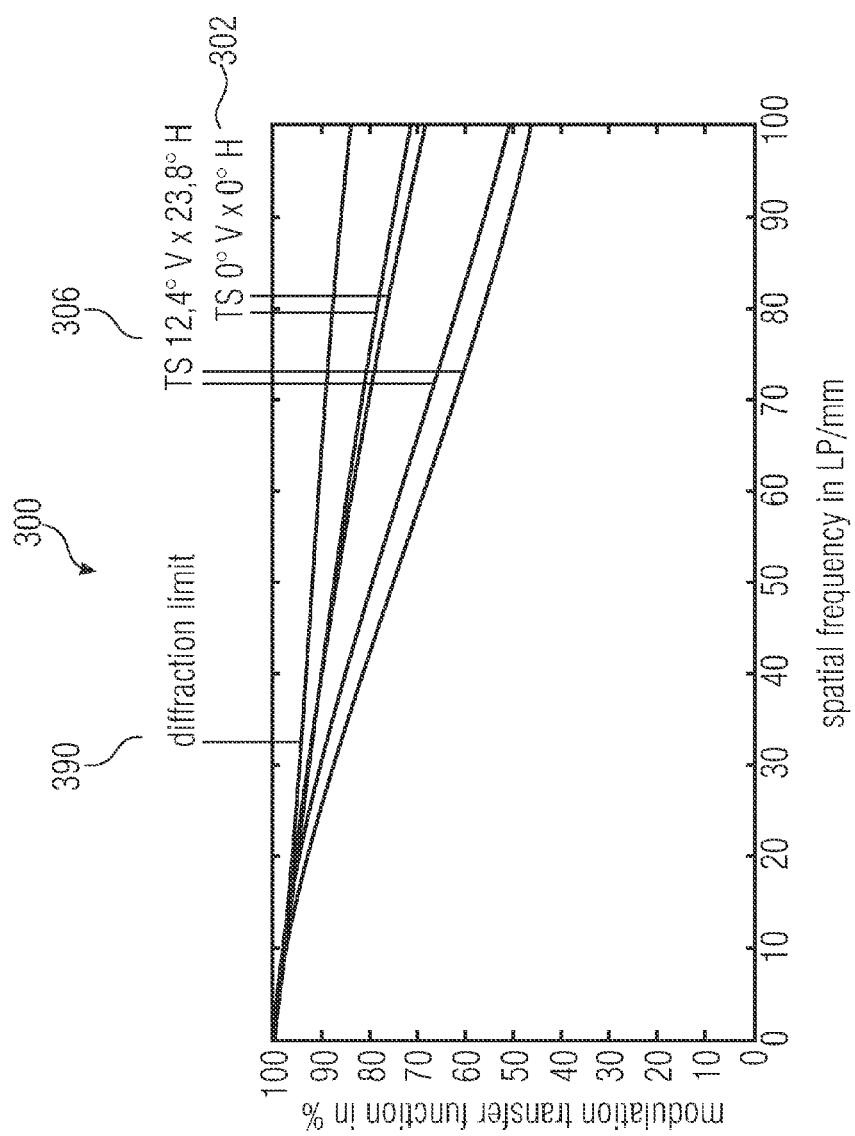
FIG. 3 is a representation of a modulation transfer function of the monolithic objectives shown in FIGS. 1a-c and 2.

FIG. 3 shows an illustration of the modulation transfer function (MTF) 300 of the monolithic objective shown in FIGS. 1a-c and FIG. 2 with reflective and refractive functional areas. The modulation transfer function illustrates the imaging quality or the quality of an objective in dependence on a spatial frequency and different image field angles. FIG. 3 illustrates two examples for two different image field angles 302, 306. Thereby, field 1 (shown at reference numeral 302) shows a beam incident on an object angle of 0°, which corresponds to imaging a point-shaped object in the center of the image field. Field 2 (as shown at reference numeral 306) illustrates a beam incident at an object angle of 12.4° and 23.8°, which corresponds to imaging a point-shaped object in a corner of the image field. Additionally, the MTF of the diffraction limit 390 is inserted. The diffraction limit 390 presents the best possible imaging of a point-shaped object by the objective. This means, the higher the MTF, the better the imaging quality of the objective.

The modulation transfer function 300 shows, for the monolithic objective shown in FIGS. 1a-c and FIG. 2 with reflective and refractive functional areas, an imaging performance common for commercial photo objectives.

Following the description of the above embodiments, different generalization options and implementation options for the above embodiments, such as material selection or the same, will be pointed out.

The basis for the above-described monolithic objectives can be an optical material that is transparent for a selected part of the electromagnetic spectrum. This means that a large part of this selected electromagnetic spectrum, i.e. normally between 30% and 100% of the radiation are transmitted by the optical material. Further, the used optical material is to be formed easily and long-term resistant to environmental influences, such as temperature and moisture. For the visible spectral range, a plurality of optical glasses are possible for blank molding, but also plastics, such as PMMA or Zeonex®. For example, the material of which the above-mentioned monolithic body 100a or 200a is made is transparent across a spectral range, for example in the ultraviolet, visible and/or infrared spectral range, for example in a wavelength range of more than 100 nm. The above-described monolithic objectives comprised several optical functional areas, wherein a first optical functional area 110 served as the entrance area, where the electromagnetic radiation enters the material. As has been described above, the entrance area can be shaped such that its center of curvature is arranged close to the center of the entrance pupil of the system, whereby the beams are only slightly refracted and, hence, the refractive interface 110 of the entrance area only causes slight geometric and chromatic aberrations.

In the optical path direction, further functional areas follow, specifically rear-side mirrored convex and concave optical functional areas together resulting in a center shading-free, folded optical path. A further functional area 160 following in the optical path direction forms the exit area of the monolithic objective, where the electromagnetic radiation exits the full body and generates an image at a defined distance from the exit area 160. The smaller the distance between image sensor or image level and exit area, the smaller the effect of chromatic and geometric aberrations, which could result from refraction at the exit area 160, on the image.

The exit area 160 comprises, like the entrance area 110, a curvature whose center of curvature approximately coincides with the center of the exit pupil of the system, or the objective, whereby aberrations by the refraction at the exit area can be minimized. If the exit pupil, as in the previous embodiments, is almost at infinity, an optical path is formed which is almost telecentric on the image side. In an optical path that is telecentric on the image side, the principal rays of the individual beams run behind the last functional area of an objective in parallel and can, hence, also impinge perpendicularly on the image sensor. If, however, beams running at the far edge were to impinge in an oblique manner on the digital image sensor, shadings of the light-sensitive sensor areas could result, for example, by elevated conductive traces on the chip, or so-called ghost images could result by reflections at the cover glass. In the case of an optical path that is telecentric or almost telecentric on the image side, the exit area can be implemented as a planar area, which largely simplifies its producibility and, hence, significantly reduces the costs for mold production. Further, the objective, as in the above embodiments, can be implemented such that, for example, an image sensor commercially encapsulated with a cover glass can be attached to or mounted on the planar exit area of the objective more easily without additional mechanical components. With this method, the assembly effort can be significantly reduced and, hence, enormous cost advantages can be obtained. Further, critical adjustment and assembly tolerances are avoided.

With reference to the above embodiments, it should be noted that the existence of a cover glass 170 for the image sensor is not necessitated. Some applications even request that the image sensor be implemented without cover glass. In these cases, the image sensor could be positioned and fixed behind the exit area at a defined air gap by means of mechanical components protecting the bare chip from external influences.

The curvatures of the rear-mirrored areas 120-150 of the above embodiments as well as their tilt angles and aspheric forms can be adjusted such that a high-quality image results in the image level 180. The image sensor arranged in the image level can also be a matrix sensor.

Depending on the embodiment, the above-mentioned optical functional areas 110-160 can be planar, spherical, conical or biconical shapes, higher-order aspheric forms, used on the axis or off axis. Further, free-form areas are possible that can be described, for example, with the help of complete polynomials, polynomial extensions or non-uniform rational B-splines, in short NURBs. NURBS are geometric elements, such as curves or areas that can be used for modeling any molds, that are mathematically functionally defined bit by bit.

The above embodiments can also be varied with respect to the implementation of the optical functional areas. The optical functional areas 110-160 can either be left without a coating or can be provided with an anti-reflective coating or a partly or completely reflecting layer. The anti-reflective and mirror coatings of the optical functional elements are thereby adjusted to the selected part of the electromagnetic spectrum and the desired degree of transmission and reflection. Thereby, the anti-reflective coatings can consist of an individual dielectric layer or a dielectric layer stack. The mirror layers can consist of a metallic layer, a dielectric layer, a dielectric layer stack or a combination of a metallic and a dielectric layer. Corresponding to the selected spectral range, the spectral transmission of the anti-reflection layers or the spectral reflectivity of the mirroring layers can be adapted to a wavelength range in the ultraviolet, visible or near-infrared range.

Further, with reference to the above embodiments, the following should be noted. For suppressing stray light, for example, all area parts of the surface of the monolithic body 100a or 200a not representing any functional areas, such as areas 115, 125, 135, 145, 155, representing side areas of the body 100a or 200a each connecting pairs of the functional areas 110-160 with one another, as well as a top side 165a and a bottom side 165b of the body 100a and 200a can be provided with a layer reducing scattering and stray light. This layer can, for example, be an absorbing varnish applied by painting or spraying. Further, openings in the monolithic objective and in the monolithic body 100a and 200a, respectively, are possible, into which, for reducing scattering light and stray light, for example, black-stained brass sheets are introduced, or which are filled with absorbing, e.g. black pigmented, plastics or whose side areas are provided with absorbing varnish. Such openings can be provided in the monolithic full body 100a-200a, for example in the form of grooves or bores or notches.

In the above embodiments, mainly the functional areas were discussed, i.e. the areas fulfilling an optical function with respect to the geometrical-optical imaging characteristics of the objective. These are, in particular, all areas that are located in the optical path of the objective, wherein such areas can also be planar areas as well as curved areas, such as the above-described rear-side-mirrored spherical or aspherical areas. Areas having only a mechanical function or a passive optical function, however, such as planar side areas of the full body that can be provided with a specific coating for suppressing scattering light, are, on the contrary, not considered as functional areas, the above-mentioned areas 115, 125, 135, 145 and 155, for example, belong to them. These non-optical areas or functionless areas can be produced as planar areas to ease production, and they can have different degrees of roughness and coatings that can have optical and/or other functionalities. In particular, further mechanical features for attachment to or mounting on further devices can exist, such as to/on the housing of a device comprising the objective and image-capturing system, respectively.

The terms "convex" and "concave" have been selected above for describing the surface shape of the curved functional areas in more detail and the respective impinging direction of the rays. Thereby, it can happen that mirrors of monolithic objectives having reflective and refractive functional areas according to the above embodiments comprise a convex form when seen from the outside, but can act as a concave mirror within the monolithic body. The same happens with a functional area that is concave when seen from the outside, which is rear-mirrored. The same acts as a convex mirror within the monolithic body and is, hence, also referred to as such.

One possible application of the above examples is in the area of field surveillance with, for example, small unmanned airplanes with low allowable payloads. Conventional field surveillance systems frequently operate either in the visible or infrared spectral range, since the optics used there frequently have refractive components with significant chromatic imaging errors and are, hence, limited to restricted spectral ranges. Here, the above objectives with their minimal chromatic aberration and low mass have significant advantages.

A further application is the usage of the above embodiments in a helmet camera for rescue workers. Here, the option of imaging objects having high image quality with a low-mass objective has significant advantages. The objective allows the rescue workers to search smoky rooms or rooms filled with water vapor for casualties by visual examination using a camera without having to grope their way through the building. Thereby, casualties can be found more easily without unnecessarily endangering the rescuer. This application necessitates small, light and robust systems.

Thus, the above embodiments each also form a widely opened monolithic objective having a large image field of more than ±25° on the diagonal and an initial opening of less than F4.5. They can have an imaging quality comparable to conventional lens objectives and can at the same time be produced cost-effectively manner in large volumes. The above monolithic objectives can be produced in blank molding technology or with plastic-forming technology.

The above-described image sensors can, for example, be CCD or CMOS sensors and, with the examples of the above monolithic objectives, result in camera systems having high image quality.

Thus, the above embodiments also provide examples for a compact, low-mass, color error-corrected, monolithic objective with reflective and refractive functional areas causing low production costs. The imaging quality can thereby reach the common values of purely refractive systems. The above embodiments can be used anywhere where greatly reduced production costs, weight and mounting space are of importance, but where nevertheless a very high imaging quality is still necessitated with a large opening ratio. In combination with modern image sensors, such as CCD or CMOS sensors, the above embodiments also present an option for providing camera systems having high image quality.

Thus, in other words, the above embodiments describe a center shading-free, monolithic objective 100, 200 having reflective and refractive functional areas consisting of a material at least partly transparent for part of an electromagnetic spectrum and first to sixth optical functional areas, of which the first 110 is refractive and serves as the entrance area, through which electromagnetic radiation can enter the objective, the second to fifth 120-150 are reflective and serve as the first to fourth mirrors, and the sixth 160 is refractive and serves as the exit area through which the electromagnetic radiation can exit the objective, wherein the optical functional areas 110-160 are arranged such that either all optical functional elements have a common optical axis or at least two optical functional areas have a different optical axis, and such that a center shading-free, folded optical path extends from the entrance area 110 via mirrors 120-150, wherein the optical functional areas 110-160 are arranged and formed such that no intermediate image level exists in an optical path 102a between entrance and exit areas. The entrance area 110 can have a convex surface shape and its center of curvature can have a distance to a center of an entrance pupil of the objective of ±10% of the radius of curvature of the entrance area. The first mirror 120 can have a planar or convex surface whose amount of radius of curvature lies between 2 times and 15 times the system focal length. A first axis of construction $e_0$ can impinge on the first mirror 120 along the optical path 102a and can have, in an impinging point 204, an angle of incidence to the surface normal with an amount of at least 10°. A second axis of construction $e_1$ can impinge on the second mirror 130 along the optical path 102a from the first mirror 120 in an impinging point 206. Then, the second mirror 130 can have a concave surface whose amount of the radius of curvature can be between 3 times and 30 times the focal length of the objective. The amount of a lateral shift $d_2$ of its optical axis 234 from the impinging point of the second axis of construction $e_1$ on the second mirror 130 can be less than 3 times the system focal length, measured orthogonally to the optical axis 234 of the second mirror 130. A length of the second axis of construction $e_1$ between the first mirror 120 and the second mirror 130 can be between 1 and 10 times the focal length of the objective. A third axis of construction $e_2$ can impinge on the third mirror 140 along the optical path 102a from the second mirror 130, wherein the length of the third axis of construction $e_2$ between the second mirror 130 and the third mirror 140 lies between 0.5 times and 6 times the focal length of the objective. A fourth axis of construction $e_3$ can impinge in a fourth impinging point 208 on the fourth mirror 150 along the optical path 102a from the third mirror 140. Thereby, the fourth mirror 150 can comprise a concave mirror area whose amount of radius of curvature lies between 1 times and 10 times the focal length of the objective. Additionally, the same can comprise a conical constant greater than or equal to zero. The amount of a lateral shift $d_4$ of its optical axis 254 from the impinging point 208 of the fourth axis of construction $e_3$ on the fourth mirror 150 can be smaller than 5 times the focal length of the objective measured orthogonally to the optical axis 254 of the fourth mirror 150. A length of the fourth axis of construction $e_3$ between the third mirror 140 and the fourth mirror 150 can be between 0.5 times and 6 times the focal length of the objective. A fifth axis of construction $e_4$ along the optical path 102a can impinge on the image level from the fourth mirror 150, and can lie between 0.5 times and 10 times the focal length of the objective between the fourth mirror 150 and the exit area 160.

The above parameters for $e_1$ to $e_4$ and $\alpha_1$ to $\alpha_4$ are given by the following inequalities according to a further embodiment:

| | |
|---|---|
| $e_1$ between f and 10f | $\alpha_1 > 10°$ |
| $e_2$ between $0.3e_1$ and $0.7e_1$ | $1.5\alpha_1 < \alpha_2 < 2.5\alpha_1$ |
| $e_3$ between $0.3e_1$ and $0.7e_1$ | $1.2\alpha_1 < \alpha_3 < 2.5\alpha_1°$ |
| $e_4$ between $0.3e_1$ and $1.5e_1$ | $0.3\alpha_1 < -\alpha_4 < 1\alpha_1$ |

The above objectives can have a fixed diagonal image angle of more than ±25° and an f number of less than or equal to F4.5. The optical functional areas can comprise a coating consisting of a layer or a layer stack being reflex-reducing or partially transmissive or reflecting for part of the electromagnetic spectrum. The curved functional areas can be implemented spherically or aspherically or as free-form areas. Areas that are not optically used can comprise a coating for reducing stray and scattering light. Additionally, the monolithic body can comprise at least one opening into which a medium for reducing stray and scattering light is integrated. The monolithic body can consist of glass material or plastic. As has also been described above, an image-rendering system can be obtained by combining such a center shading-free monolithic objective with reflective and refractive functional areas and a sensor or detector for detecting electromagnetic radiation with at least one element. The image-capturing system can also comprise read-out electronics for the sensor or detector.

Regarding the above embodiments, it should be noted that the body 100a has been illustrated in FIGS. 1a-c as essentially prismatic, but that other forms are also easily possible, as has already been stated in the above description with regard to the non-functional areas. In particular, the top and bottom sides do not have to be parallel to each other, but the sides can approach one another in the direction of the optical path, i.e. the body can become flatter.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. Objective comprising a monolithic optically transparent body, the surface of which comprises:
    a first optical refractive functional area serving as entrance area through which electromagnetic radiation can enter the objective;
    a second optical reflective functional area serving as a first mirror;
    a third optical reflective functional area serving as a second mirror;
    a fourth optical reflective functional area serving as a third mirror;
    a fifth optical reflective functional area serving as a fourth mirror; and
    a sixth optical refractive functional area serving as an exit area through which electromagnetic radiation can exit the objective; wherein
    the first to sixth optical functional areas are arranged such that a center shading-free, folded optical path extends from the entrance area through the monolithic body via the first mirror, the second mirror, the third mirror and the fourth mirror to the exit area, in the stated order;
    no intermediate image level is located between the entrance area and the exit area; and
    the first to sixth optical functional areas comprise a common optical axis.

2. Objective according to claim 1, wherein the first to sixth optical functional areas are arranged such that at least two of the optical functional areas comprise a different optical axis.

3. Objective according to claim 2, wherein the at least two optical functional areas, at least the first optical reflective functional area and the third optical reflective functional area comprise a different optical axis.

4. Objective according to claim 1, wherein:
    a first axis of construction along the optical path impinges on the first mirror in a first impinging point and at a first angle of incidence to a surface normal at the first impinging point;
    a second axis of construction along the optical path from the first impinging point impinges, at a first angle of reflection to the surface normal at the first impinging point equal to the first angle of incidence, on the second mirror in a second impinging point at a second angle of incidence to a surface normal at the second impinging point;
    a third axis of construction along the optical path from the second impinging point impinges, at a second angle of reflection to the surface normal at the second impinging point equal to the second angle of incidence, on the third mirror in a third impinging point at a third angle of incidence;
    a fourth axis of construction along the optical path from the third impinging point impinges, at a third angle of reflection to the surface normal equal to the third angle of incidence, on the fourth mirror in a fourth impinging point at a fourth angle of incidence to a surface normal at the fourth impinging point;
    a fifth axis of construction along the optical path from the fourth impinging point impinges, at a fourth angle of reflection to the surface normal equal to the fourth angle of incidence, on an image level of the objective at the fourth impinging point; and
    the first angle of incidence comprises an amount of at least 10°.

5. Objective according to claim 1, wherein the monolithic body is made of glass material or plastic.

6. Objective comprising a monolithic optically transparent body, the surface of which comprises:
    a first optical refractive functional area serving as entrance area through which electromagnetic radiation can enter the objective;
    a second optical reflective functional area serving as a first mirror;
    a third optical reflective functional area serving as a second mirror;
    a fourth optical reflective functional area serving as a third mirror;
    a fifth optical reflective functional area serving as a fourth mirror; and
    a sixth optical refractive functional area serving as an exit area through which electromagnetic radiation can exit the objective; wherein
    the first to sixth optical functional areas are arranged such that a center shading-free, folded optical path extends from the entrance area through the monolithic body via the first mirror, the second mirror, the third mirror and the fourth mirror to the exit area, in the stated order;

no intermediate image level is located between the entrance area and the exit area; and the entrance area comprises a surface shape convex with respect to the optical path direction comprising a center of curvature that is spaced apart from the center of an entrance pupil of the objective by at least 10% of a radius of curvature of the entrance area.

7. Objective comprising a monolithic optically transparent body, the surface of which comprises:

a first optical refractive functional area serving as entrance area through which electromagnetic radiation can enter the objective;

a second optical reflective functional area serving as a first mirror;

a third optical reflective functional area serving as a second mirror;

a fourth optical reflective functional area serving as a third mirror;

a fifth optical reflective functional area serving as a fourth mirror; and a sixth optical refractive functional area serving as an exit area through which electromagnetic radiation can exit the objective; wherein the first to sixth optical functional areas are arranged such that a center shading-free, folded optical path extends from the entrance area through the monolithic body via the first mirror, the second mirror, the third mirror and the fourth mirror to the exit area, in the stated order;

no intermediate image level is located between the entrance area and the exit area; and the first mirror comprises a surface shape that is planar or convex with respect to the optical path direction comprising a radius of curvature whose amount lies between two and 15 times of a focal length of the objective.

8. Objective comprising a monolithic optically transparent body, the surface of which comprises:

a first optical refractive functional area serving as entrance area through which electromagnetic radiation can enter the objective;

a second optical reflective functional area serving as a first mirror;

a third optical reflective functional area serving as a second mirror;

a fourth optical reflective functional area serving as a third mirror;

a fifth optical reflective functional area serving as a fourth mirror; and a sixth optical refractive functional area serving as an exit area through which electromagnetic radiation can exit the objective; wherein the first to sixth optical functional areas are arranged such that a center shading-free, folded optical path extends from the entrance area through the monolithic body via the first mirror, the second mirror, the third mirror and the fourth mirror to the exit area, in the stated order;

no intermediate image level is located between the entrance area and the exit area;

a first axis of construction along the optical path impinges on the first mirror in a first impinging point and at a first angle of incidence to a surface normal at the first impinging point;

a second axis of construction along the optical path from the first impinging point impinges, at a first angle of reflection to the surface normal at the first impinging point equal to the first angle of incidence, on the second mirror in a second impinging point at a second angle of incidence to a surface normal at the second impinging point;

a third axis of construction along the optical path from the second impinging point impinges, at a second angle of reflection to the surface normal at the second impinging point equal to the second angle of incidence, on the third mirror in a third impinging point at a third angle of incidence;

a fourth axis of construction along the optical path from the third impinging point impinges, at a third angle of reflection to the surface normal equal to the third angle of incidence, on the fourth mirror in a fourth impinging point at a fourth angle of incidence to a surface normal at the fourth impinging point;

a fifth axis of construction along the optical path from the fourth impinging point impinges, at a fourth angle of reflection to the surface normal equal to the fourth angle of incidence, on an image level of the objective at the fourth impinging point;

the first angle of incidence comprises an amount of at least 10°; and the second mirror comprises a surface shape concave with respect to the optical path direction comprising a radius of curvature whose amount lies between three times and 30 times the focal length of the objective, and an optical axis which is spaced apart from the second impinging point by less than three times the focal length of the objective.

9. Objective comprising a monolithic optically transparent body, the surface of which comprises:

a first optical refractive functional area serving as entrance area through which electromagnetic radiation can enter the objective;

a second optical reflective functional area serving as a first mirror;

a third optical reflective functional area serving as a second mirror;

a fourth optical reflective functional area serving as a third mirror;

a fifth optical reflective functional area serving as a fourth mirror; and a sixth optical refractive functional area serving as an exit area through which electromagnetic radiation can exit the objective; wherein the first to sixth optical functional areas are arranged such that a center shading-free, folded optical path extends from the entrance area through the monolithic body via the first mirror, the second mirror, the third mirror and the fourth mirror to the exit area, in the stated order;

no intermediate image level is located between the entrance area and the exit area;

a first axis of construction along the optical path impinges on the first mirror in a first impinging point and at a first angle of incidence to a surface normal at the first impinging point;

a second axis of construction along the optical path from the first impinging point impinges, at a first angle of reflection to the surface normal at the first impinging point equal to the first angle of incidence, on the second mirror in a second impinging point at a second angle of incidence to a surface normal at the second impinging point;

a third axis of construction along the optical path from the second impinging point impinges, at a second angle of reflection to the surface normal at the second impinging point equal to the second angle of incidence, on the third mirror in a third impinging point at a third angle of incidence;

a fourth axis of construction along the optical path from the third impinging point impinges, at a third angle of reflection to the surface normal equal to the third angle of incidence, on the fourth mirror in a fourth impinging point at a fourth angle of incidence to a surface normal at the fourth impinging point;

a fifth axis of construction along the optical path from the fourth impinging point impinges, at a fourth angle of reflection to the surface normal equal to the fourth angle of incidence, on an image level of the objective at the fourth impinging point;

the first angle of incidence comprises an amount of at least 10°; and a length of the second axis of construction between the first impinging point and the second impinging point lies between one and 10 times the focal length of the objective.

10. Objective comprising a monolithic optically transparent body, the surface of which comprises:

a first optical refractive functional area serving as entrance area through which electromagnetic radiation can enter the objective;

a second optical reflective functional area serving as a first mirror;

a third optical reflective functional area serving as a second mirror;

a fourth optical reflective functional area serving as a third mirror;

a fifth optical reflective functional area serving as a fourth mirror; and a sixth optical refractive functional area serving as an exit area through which electromagnetic radiation can exit the objective; wherein the first to sixth optical functional areas are arranged such that a center shading-free, folded optical path extends from the entrance area through the monolithic body via the first mirror, the second mirror, the third mirror and the fourth mirror to the exit area, in the stated order;

no intermediate image level is located between the entrance area and the exit area;

a first axis of construction along the optical path impinges on the first mirror in a first impinging point and at a first angle of incidence to a surface normal at the first impinging point;

a second axis of construction along the optical path from the first impinging point impinges, at a first angle of reflection to the surface normal at the first impinging point equal to the first angle of incidence, on the second mirror in a second impinging point at a second angle of incidence to a surface normal at the second impinging point;

a third axis of construction along the optical path from the second impinging point impinges, at a second angle of reflection to the surface normal at the second impinging point equal to the second angle of incidence, on the third mirror in a third impinging point at a third angle of incidence;

a fourth axis of construction along the optical path from the third impinging point impinges, at a third angle of reflection to the surface normal equal to the third angle of incidence, on the fourth mirror in a fourth impinging point at a fourth angle of incidence to a surface normal at the fourth impinging point;

a fifth axis of construction along the optical path from the fourth impinging point impinges, at a fourth angle of reflection to the surface normal equal to the fourth angle of incidence, on an image level of the objective at the fourth impinging point;

the first angle of incidence comprises an amount of at least 10°; and the length of the third axis of construction between the second impinging point and the third impinging point lies between 0.5 times and 6 times the focal length of the objective.

11. Objective comprising a monolithic optically transparent body, the surface of which comprises:

a first optical refractive functional area serving as entrance area through which electromagnetic radiation can enter the objective;

a second optical reflective functional area serving as a first mirror;

a third optical reflective functional area serving as a second mirror;

a fourth optical reflective functional area serving as a third mirror;

a fifth optical reflective functional area serving as a fourth mirror; and a sixth optical refractive functional area serving as an exit area through which electromagnetic radiation can exit the objective; wherein the first to sixth optical functional areas are arranged such that a center shading-free, folded optical path extends from the entrance area through the monolithic body via the first mirror, the second mirror, the third mirror and the fourth mirror to the exit area, in the stated order;

no intermediate image level is located between the entrance area and the exit area;

a first axis of construction along the optical path impinges on the first mirror in a first impinging point and at a first angle of incidence to a surface normal at the first impinging point;

a second axis of construction along the optical path from the first impinging point impinges, at a first angle of reflection to the surface normal at the first impinging point equal to the first angle of incidence, on the second mirror in a second impinging point at a second angle of incidence to a surface normal at the second impinging point;

a third axis of construction along the optical path from the second impinging point impinges, at a second angle of reflection to the surface normal at the second impinging point equal to the second angle of incidence, on the third mirror in a third impinging point at a third angle of incidence;

a fourth axis of construction along the optical path from the third impinging point impinges, at a third angle of reflection to the surface normal equal to the third angle of incidence, on the fourth mirror in a fourth impinging point at a fourth angle of incidence to a surface normal at the fourth impinging point;

a fifth axis of construction along the optical path from the fourth impinging point impinges, at a fourth angle of reflection to the surface normal equal to the fourth angle of incidence, on an image level of the objective at the fourth impinging point;

the first angle of incidence comprises an amount of at least 10°; and the fourth mirror comprises a surface shape concave with respect to the optical path direction comprising a radius of curvature that lies between 1 times and 10 times the focal length of the objective, a conical constant larger than or equal to zero, and an optical axis which is spaced apart from the fourth impinging point by less than five times the focal length of the objective.

12. Objective comprising a monolithic optically transparent body, the surface of which comprises:
- a first optical refractive functional area serving as entrance area through which electromagnetic radiation can enter the objective;
- a second optical reflective functional area serving as a first mirror;
- a third optical reflective functional area serving as a second mirror;
- a fourth optical reflective functional area serving as a third mirror;
- a fifth optical reflective functional area serving as a fourth mirror; and
- a sixth optical refractive functional area serving as an exit area through which electromagnetic radiation can exit the objective; wherein
- the first to sixth optical functional areas are arranged such that a center shading-free, folded optical path extends from the entrance area through the monolithic body via the first mirror, the second mirror, the third mirror and the fourth mirror to the exit area, in the stated order;
- no intermediate image level is located between the entrance area and the exit area;
- a first axis of construction along the optical path impinges on the first mirror in a first impinging point and at a first angle of incidence to a surface normal at the first impinging point;
- a second axis of construction along the optical path from the first impinging point impinges, at a first angle of reflection to the surface normal at the first impinging point equal to the first angle of incidence, on the second mirror in a second impinging point at a second angle of incidence to a surface normal at the second impinging point;
- a third axis of construction along the optical path from the second impinging point impinges, at a second angle of reflection to the surface normal at the second impinging point equal to the second angle of incidence, on the third mirror in a third impinging point at a third angle of incidence;
- a fourth axis of construction along the optical path from the third impinging point impinges, at a third angle of reflection to the surface normal equal to the third angle of incidence, on the fourth mirror in a fourth impinging point at a fourth angle of incidence to a surface normal at the fourth impinging point;
- a fifth axis of construction along the optical path from the fourth impinging point impinges, at a fourth angle of reflection to the surface normal equal to the fourth angle of incidence, on an image level of the objective at the fourth impinging point;
- the first angle of incidence comprises an amount of at least 10°; and
- a length of the fourth axis of construction between the third impinging point and the fourth impinging point lies between 0.5 times and 6 times the focal length of the objective.

13. Objective comprising a monolithic optically transparent body, the surface of which comprises:
- a first optical refractive functional area serving as entrance area through which electromagnetic radiation can enter the objective;
- a second optical reflective functional area serving as a first mirror;
- a third optical reflective functional area serving as a second mirror;
- a fourth optical reflective functional area serving as a third mirror;
- a fifth optical reflective functional area serving as a fourth mirror; and
- a sixth optical refractive functional area serving as an exit area through which electromagnetic radiation can exit the objective; wherein
- the first to sixth optical functional areas are arranged such that a center shading-free, folded optical path extends from the entrance area through the monolithic body via the first mirror, the second mirror, the third mirror and the fourth mirror to the exit area, in the stated order;
- no intermediate image level is located between the entrance area and the exit area;
- a first axis of construction along the optical path impinges on the first mirror in a first impinging point and at a first angle of incidence to a surface normal at the first impinging point;
- a second axis of construction along the optical path from the first impinging point impinges, at a first angle of reflection to the surface normal at the first impinging point equal to the first angle of incidence, on the second mirror in a second impinging point at a second angle of incidence to a surface normal at the second impinging point;
- a third axis of construction along the optical path from the second impinging point impinges, at a second angle of reflection to the surface normal at the second impinging point equal to the second angle of incidence, on the third mirror in a third impinging point at a third angle of incidence;
- a fourth axis of construction along the optical path from the third impinging point impinges, at a third angle of reflection to the surface normal equal to the third angle of incidence, on the fourth mirror in a fourth impinging point at a fourth angle of incidence to a surface normal at the fourth impinging point;
- a fifth axis of construction along the optical path from the fourth impinging point impinges, at a fourth angle of reflection to the surface normal equal to the fourth angle of incidence, on an image level of the objective at the fourth impinging point;
- the first angle of incidence comprises an amount of at least 10°; and
- a portion of the fifth axis of construction between the fourth impinging point and a point where the fifth axis of construction penetrates the exit area lies between 0.5 times and 10 times the focal length of the objective.

14. Objective comprising a monolithic optically transparent body, the surface of which comprises:
- a first optical refractive functional area serving as entrance area through which electromagnetic radiation can enter the objective;
- a second optical reflective functional area serving as a first mirror;
- a third optical reflective functional area serving as a second mirror;
- a fourth optical reflective functional area serving as a third mirror;
- a fifth optical reflective functional area serving as a fourth mirror; and a sixth optical refractive functional area serving as an exit area through which electromagnetic radiation can exit the objective; wherein the first to sixth optical functional areas are arranged such that a center shading-free, folded optical path extends from the entrance area through the monolithic body via the first mirror, the second mirror, the third mirror and the fourth mirror to the exit area, in the stated order;

no intermediate image level is located between the entrance area and the exit area; and the third mirror comprises a surface shape convex with respect to the optical path direction.

15. Objective comprising a monolithic optically transparent body, the surface of which comprises:

a first optical refractive functional area serving as entrance area through which electromagnetic radiation can enter the objective;

a second optical reflective functional area serving as a first mirror;

a third optical reflective functional area serving as a second mirror;

a fourth optical reflective functional area serving as a third mirror;

a fifth optical reflective functional area serving as a fourth mirror; and a sixth optical refractive functional area serving as an exit area through which electromagnetic radiation can exit the objective; wherein the first to sixth optical functional areas are arranged such that a center shading-free, folded optical path extends from the entrance area through the monolithic body via the first mirror, the second mirror, the third mirror and the fourth mirror to the exit area, in the stated order;

no intermediate image level is located between the entrance area and the exit area; and the third mirror is arranged such that the same acts as a system aperture of the objective.

16. Objective comprising a monolithic optically transparent body, the surface of which comprises:

a first optical refractive functional area serving as entrance area through which electromagnetic radiation can enter the objective;

a second optical reflective functional area serving as a first mirror;

a third optical reflective functional area serving as a second mirror;

a fourth optical reflective functional area serving as a third mirror;

a fifth optical reflective functional area serving as a fourth mirror; and a sixth optical refractive functional area serving as an exit area through which electromagnetic radiation can exit the objective; wherein the first to sixth optical functional areas are arranged such that a center shading-free, folded optical path extends from the entrance area through the monolithic body via the first mirror, the second mirror, the third mirror and the fourth mirror to the exit area, in the stated order;

no intermediate image level is located between the entrance area and the exit area; and the objective comprises a fixed diagonal image angle of more than ±25° and an f number of less than or equal to F4.5.

17. Objective comprising a monolithic optically transparent body, the surface of which comprises:

a first optical refractive functional area serving as entrance area through which electromagnetic radiation can enter the objective;

a second optical reflective functional area serving as a first mirror;

a third optical reflective functional area serving as a second mirror;

a fourth optical reflective functional area serving as a third mirror;

a fifth optical reflective functional area serving as a fourth mirror; and a sixth optical refractive functional area serving as an exit area through which electromagnetic radiation can exit the objective; wherein the first to sixth optical functional areas are arranged such that a center shading-free, folded optical path extends from the entrance area through the monolithic body via the first mirror, the second mirror, the third mirror and the fourth mirror to the exit area, in the stated order;

no intermediate image level is located between the entrance area and the exit area; and the second, third, fourth and fifth optical reflective functional areas are provided with a reflective coating.

18. Objective comprising a monolithic optically transparent body, the surface of which comprises:

a first optical refractive functional area serving as entrance area through which electromagnetic radiation can enter the objective;

a second optical reflective functional area serving as a first mirror;

a third optical reflective functional area serving as a second mirror;

a fourth optical reflective functional area serving as a third mirror;

a fifth optical reflective functional area serving as a fourth mirror; and a sixth optical refractive functional area serving as an exit area through which electromagnetic radiation can exit the objective; wherein the first to sixth optical functional areas are arranged such that a center shading-free, folded optical path extends from the entrance area through the monolithic body via the first mirror, the second mirror, the third mirror and the fourth mirror to the exit area, in the stated order;

no intermediate image level is located between the entrance area and the exit area; and the first and/or the sixth optical refractive functional area is provided with a reflection-reducing and/or spectrally filtering coating.

19. Objective comprising a monolithic optically transparent body, the surface of which comprises:

a first optical refractive functional area serving as entrance area through which electromagnetic radiation can enter the objective;

a second optical reflective functional area serving as a first mirror;

a third optical reflective functional area serving as a second mirror;

a fourth optical reflective functional area serving as a third mirror;

a fifth optical reflective functional area serving as a fourth mirror; and a sixth optical refractive functional area serving as an exit area through which electromagnetic radiation can exit the objective; wherein the first to sixth optical functional areas are arranged such that a center shading-free, folded optical path extends from the entrance area through the monolithic body via the first mirror, the second mirror, the third mirror and the fourth mirror to the exit area, in the stated order;

no intermediate image level is located between the entrance area and the exit area; and area portions of the surface of the monolithic body not optically penetrated by the optical path are provided with a coating reducing stray and scattering light.

20. Objective comprising a monolithic optically transparent body, the surface of which comprises:

a first optical refractive functional area serving as entrance area through which electromagnetic radiation can enter the objective;

a second optical reflective functional area serving as a first mirror;

a third optical reflective functional area serving as a second mirror;

a fourth optical reflective functional area serving as a third mirror;

a fifth optical reflective functional area serving as a fourth mirror; and a sixth optical refractive functional area serving as an exit area through which electromagnetic radiation can exit the objective; wherein the first to sixth optical functional areas are arranged such that a center shading-free, folded optical path extends from the entrance area through the monolithic body via the first mirror, the second mirror, the third mirror and the fourth mirror to the exit area, in the stated order;

no intermediate image level is located between the entrance area and the exit area; and the monolithic body comprises at least one opening into which a medium for reducing stray and scattering light is integrated.

21. Image-capturing system, comprising:

an objective comprising a monolithic optically transparent body, the surface of which comprises:

a first optical refractive functional area serving as entrance area through which electromagnetic radiation can enter the objective;

a second optical reflective functional area serving as a first mirror;

a third optical reflective functional area serving as a second mirror;

a fourth optical reflective functional area serving as a third mirror;

a fifth optical reflective functional area serving as a fourth mirror; and a sixth optical refractive functional area serving as an exit area through which electromagnetic radiation can exit the objective; and an image sensor arranged in an image level of the objective; wherein the first to sixth optical functional areas are arranged such that a center shading-free, folded optical path extends from the entrance area through the monolithic body via the first mirror, the second mirror, the third mirror and the fourth mirror to the exit area, in the stated order;

no intermediate image level is located between the entrance area and the exit area; and the image sensor is mounted directly on the exit area of the objective.

* * * * *

UNITED STATES PATENT AND TRADEMARK OFFICE
CERTIFICATE OF CORRECTION

| | |
|---|---|
| PATENT NO. | : 8,526,126 B2 |
| APPLICATION NO. | : 13/221177 |
| DATED | : September 3, 2013 |
| INVENTOR(S) | : Kristof Seidl et al. |

It is certified that error appears in the above-identified patent and that said Letters Patent is hereby corrected as shown below:

Title Page, Item (73) Assignee, please correct the spelling to:

Fraunhofer-Gesellschaft zur Foerderung der angewandten Forschung e.V., Munich (DE)

Signed and Sealed this
Third Day of December, 2013

Margaret A. Focarino
*Commissioner for Patents of the United States Patent and Trademark Office*